Nov. 3, 1942.  J. CHURCHWARD  2,301,108
ELECTRODE HOLDER
Filed Aug. 27, 1941   2 Sheets-Sheet 1
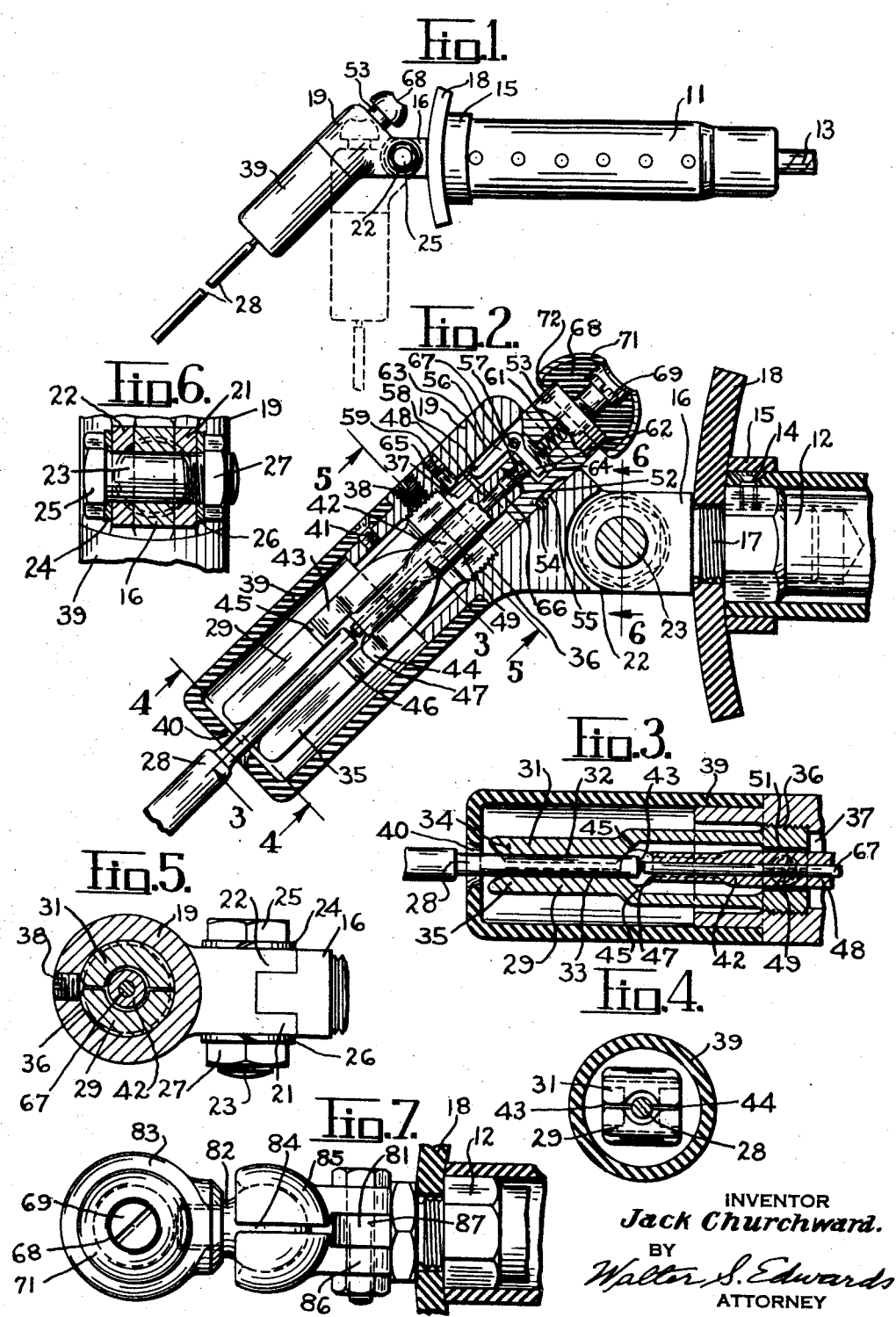
INVENTOR
Jack Churchward.
BY
Walter S. Edwards
ATTORNEY Nov. 3, 1942.                J. CHURCHWARD                2,301,108
                              ELECTRODE HOLDER
                           Filed Aug. 27, 1941           2 Sheets-Sheet 2
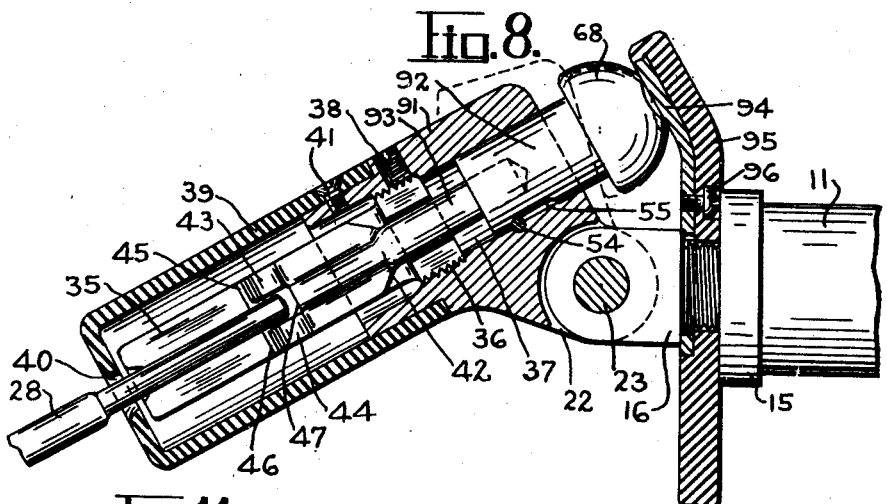
INVENTOR
Jack Churchward.
BY
Walter S. Edwards
ATTORNEY Patented Nov. 3, 1942

2,301,108

UNITED STATES PATENT OFFICE 2,301,108

ELECTRODE HOLDER

Jack Churchward, New Haven, Conn., assignor of one-half to Myrlon A. Farnham, New Haven, Conn.

Application August 27, 1941, Serial No. 408,443

15 Claims. (Cl. 219—8)

This invention relates to electrode holders for use with electric arc welding, or like machines, and more particularly to a new and improved form of electrode holder adapted to receive and hold elongated rod-shaped welding electrodes.

Many difficulties have been experienced in the use of the present known forms of electrode holders. For instance, there are often places encountered where the present forms of electrode holders are incapable of properly presenting an electrode for efficient welding. In other instances, the electrodes become partially welded to the holder parts engaging them, making it difficult to remove the used electrode to replace it with a new one. This last difficulty has been found to be partly caused by heat radiating from the point where the welding operation is taking place and partly from flying particles of molten metal adhering to the engaged holder part and the portion of the electrode engaged thereby.

One object of the present invention is to provide an improved electrode holder for arc welding machines whereby the above difficulties will be overcome.

Another object is to provide an electrode holder of the above nature whereby the electrode held thereby will be capable of use in places at present not readily accessible to electrodes held in holders now generally in use.

Still another object is to provide in an electrode holder of the above nature means to present the electrode to the work at various and desired angles.

Further objects are to provide in an electrode holder; means to protect the electrode gripping means from heat radiated from the welding operation and from flying particles of molten metal; means to substantially simultaneously open the electrode gripping means and eject the electrode therefrom; and means to effect the closing of the electrode gripping means upon an electrode by the action of inserting an electrode therebetween.

A still further object of this invention is to provide an electrode holder which will be relatively simple in construction, inexpensive to manufacture, readily manipulated, compact, ornamental in appearance, and very efficient and durable in use.

With these and other objects in view which will appear as the description proceeds, there has been illustrated in the accompanying drawings several forms in which the features and principles of this invention may be conveniently embodied in practice, it being understood that various changes in the precise embodiments of the invention herein disclosed may be made within the scope of what is claimed, without departing from the spirit of the invention.

In the drawings:

Figure 1 is a side view of an electrode holder embodying the features and principles of this invention;

Figure 2 is a broken vertical sectional view of the electrode holder shown in Figure 1;

Figure 3 is a broken sectional view taken on the line 3—3 of Figure 2;

Figure 4 is a cross-sectional view taken on the line 4—4 of Figure 2;

Figure 5 is a cross-sectional view taken on the line 5—5 of Figure 2;

Figure 6 is a cross-sectional view taken on the line 6—6 of Figure 2;

Figure 7 is a broken top plan view of modified form of pivotal joint between a handle member and an electrode holding head of an electrode holder embodying the features of this invention;

Figure 8 is a vertical sectional view of a modified form of electrode holder of this invention;

Figure 9 is a vertical sectional view of another modified form of electrode holder of this invention;

Figure 10 is a broken sectional view taken on the line 10—10 of Figure 9; and

Figure 11 is a cross-sectional view taken on the line 11—11 of Figure 9.

Referring now to the drawings wherein like reference numerals designate like parts through the several views, the reference numeral 11 denotes a tubular handle, preferably made of insulating material such as fibre. The handle 11 is disposed over a terminal block 12 to which an electrical cable 13 is secured in any suitable manner, for instance, as shown in my pending application Serial No. 364,626 filed November 7, 1940. The handle 11 is secured to the terminal block 12 by a screw 14, the head of which is covered by a ring of insulating material 15. In the forms shown in Figures 1–6 inclusive and 8, a hinge stud 16 has a screw-threaded end 17 screwed into corresponding screw threads provided in an adjacent end of the terminal block 12, and which, as shown in Figures 1 and 2, clamps a guard plate 18, of insulating material, against the adjacent end of the handle 11.

A metallic electrode holding head 19, having ears 21 and 22 extending therefrom and spaced apart to embrace the forward end of the hinge stud 16, is pivoted to this stud 16 by a bolt 23 which passes through the stud 16 and the ears 21 and 22. A split spring washer 24 is disposed between the head 25 of the bolt 23 and the adjacent ear 22 and a similar washer 26 is disposed between the nut 27 and the ear 21, to insure a tight hinged friction joint at this point and a good electrical contact between the stud 16 and the ears 21 and 22. As indicated in Figure 1 by full and dotted lines, the head 19 is adapted to be swung upon the bolt 23 as a pivot to position an electrode 28 at various angular positions in respect to the axis of the handle 11, whereby ready access to places, at present difficult of access by electrodes held in holders at present in use, is made possible and efficient welding at such places may be accomplished.

The means to grip the electrode 28 in all of the forms illustrated comprises, a pair of cooperating spring metal jaw members 29 and 31 having axially directed grooves 32 and 33 formed in the outer jaw ends 34 and 35 thereof to receive the upper end of the electrode 28 and tightly grip it therebetween due to the inherent spring action of these members, which acts to bias them toward each other. The inner ends of the jaw members 29 and 31 are screw-threaded to be screwed into a correspondingly threaded portion 36 of a bore 37 extending axially through the head 19. The members 29 and 31 are secured in place in the head 19 by a set screw 38 clamped tightly against the threaded ends thereof. In order to substantially prevent heat radiated from the welding operation, and flying, or spattering, molten metal particles from striking and adhering to the electrode end and the jaws 34 and 35 gripping the same, a cup-shaped guard member 39, preferably of insulating material, is disposed over the jaw members 29 and 31 and secured, as by a screw 41, to the head 19. A hole 40 formed in the end of the guard 39 permits the insertion of the electrode 28 in between the jaws 34 and 35.

Means is herein shown whereby the jaw members 29 and 31 are sprung apart to release an electrode 28 gripped between the jaws 34 and 35 and this means includes a plunger 42 having transversely spaced apart circular ends 43 and 44 adapted to ride up on cooperating and opposing bevel surfaces 45 and 46 provided on each of the jaw members 29 and 31 adjacent the inner ends of the jaws 34 and 35. The plunger 42 is provided with an end surface 47, herein shown disposed between the circular jaw opening ends 43 and 44, adapted to engage the inner end of the electrode 28 and force it from between the jaws 34 and 35 should it be adhering to either, or both, of them. The arrangement is preferably such that the circular ends 43 and 44 ride up on the beveled surfaces 45 and 46 to start opening the jaws 34 and 35 slightly in advance of the engagement of the end surface 47 with the end of the electrode 28.

The plunger 42 is provided with an axially directed shank 48 which extends upwardly through grooves 49 and 51, formed in the threaded ends of the jaw members 29 and 31, and the head 19, and has its upper end seated in a counterbore 52 provided in a plunger operating stud 53 slidably mounted in the bore 37 of the head 19. The stud 53 is prevented from rotating in and from dropping from the bore 37 by means of a pin 54 extending through the head 19 and an elongated groove 55 formed in the stud 53. Pressure upon the outer end of the stud 53 either manually, or by striking it against an object, will force the plunger downwardly to open the jaws 34 and 35 and eject an electrode 28 from between them.

Due to the biasing action of the spring jaw members 29 and 31 and the determined angle of the beveled surfaces 45 and 46, the plunger 42 is biased upwardly, when downward pressure thereon is released, and the jaws 34 and 35 will close. To hold the jaws 34 and 35 open, to permit the end of an electrode to be inserted therebetween, a catch 56 is provided and pivoted upon a pin 57 extending through the stud 53. The catch 56 is provided with a hook end 58 adapted to snap into a hole 59 provided in the head 19 when the stud 53 is pressed downwardly, movement of the hook end 58 into the hole 59 being caused by means of a coiled spring 61 reacting between the head 19 and the upper surface of an arm 62 extending at right angles inwardly from the hook end 58. The hook end 58 is disposed in a slot 63 formed in the stud 53, and the arm 62 extends into a hole 64 in the stud 53 extending inwardly beyond its axis. Preferably the hole 59 is closed by a plug 65 to prevent dirt entering the bore 37 in the head 19.

In order to trip the catch 56 to release the plunger 42 and permit the jaws 34 and 35 to close upon the end of an electrode 28 inserted therebetween, a trip rod 66 is provided. The rod 66 extends upwardly through the plunger 42, in a suitable bore provided therein, with its lower end extended beyond the end surface 47 of the plunger 42, and its upper end 67 in engagement with the undersurface of the arm 62. The upper end 67 of the rod 66 is slightly enlarged in diameter to prevent it falling out of the bore in the plunger 42. Pressure of the inner end of the electrode 28 upon the lower end of the rod 62 when the electrode is inserted between the open jaws 34 and 35 will trip the catch hook end 58 from the hole 59 and release the plunger 42, which, due to the cooperating action between the circular ends 43 and 44, and the beveled surfaces 45 and 46, will move the plunger 42 upwardly to permit the jaws 34 and 35 to close upon and tightly grip the electrode therebetween.

The upper end of the stud 53 is herein shown as being insulated by having a knob 68 of insulating material secured thereto by a screw 69. To withstand being repeatedly struck against a convenient object to actuate the plunger operating stud 53 and the plunger 42, the knob 68 is enclosed in a metal cap 71, which is secured thereto by being crimped over the lower end edge of the knob as indicated at 72; see Figure 1.

The heads 19 and 91 of the form shown in Figures 1–6 and 8 are shown as pivoted by the bolt 23 to swing only in one plane. As it is occasionally desirable that the electrode carrying head be capable of universal swinging movement, the pivotal joint between the head and the handle of the electrode holder may be constructed as shown in Figure 7. In this form the terminal block 12 is provided with a flattened end 81, herein shown as a separate part screw-threaded into the block 12. A stud 82 is screw-threaded into the head 83 and has a spherical end 84 adapted to be clamped between a pair of opposing lugs 85 and 86 secured to the flattened end 81 and clamped against the end 84, by a bolt 87, the lugs 85 and 86 having cooperating sockets therein to fit the spherical end 84 and with it form a ball joint whereby universal pivotal movement of the head 83 is obtainable.

In the form of electrode holder shown in Figure 8 the electrode holding head 91 is similar in most respects to the head 19 shown in Figure 2 and is pivoted to the handle 11 by the bolt 23. The plunger 92, which engages the plunger 42 to press it downwardly to open the jaws 34 and 35 and simultaneously eject the electrode 28, in this instance, is not restrained by a catch to hold it downwardly whereby the jaws 34 and 35 will be held open. In this form the arrangement is such that when the head 91 is swung about its pivot, the bolt 23, into the dotted position shown in Figure 8, the knob 68 engages a metallic cam plate 94 and the plunger 92 is cammed downwardly thereby to press the plunger 42 downwardly to actuate the jaws 34 and 35. Movement of the head 91 to move knob 68 away from the cam plate 94 permits the plunger 42 to be pressed upwardly by the action of these jaws as above described in respect to the form shown in Figure 2. The cam plate 94 may be secured to a guard plate 95, of insulating material, by a screw 96, the guard plate 95 being clamped between the stud 16 and the handle 11 as in the form shown in Figure 2.

In the form of electrode holder shown in Figures 9, 10, and 11 the electrode carrying head 101 is pivoted to the handle 11 by a ball and socket joint 102 similar to that shown in Figure 7. In this form the resilient electrode gripping jaws 103 and 104 due to their inherent spring tension are biased toward each other as in the form shown in Figure 2. The plunger 105 is provided with pointed ends 106 and 107 adapted to cooperate with beveled surfaces 108 and 109 provided on the jaws 103 and 104 when the plunger 105 is pressed downwardly to open the jaws and release the electrode 28. The plunger 105 also has an end surface 111 to engage the inner end of the electrode 28 and force it from between these jaws should it be stuck thereto.

The plunger 105 has an upwardly extending shank 112 which extends into a stud 113 and is secured thereto by a removable pin 114. The stud 113 is slidingly mounted in a bore 115 in the head 101 and has a knob 116 at its upper end. A coiled spring 117, disposed in the bore 115 to react between the head 101 and the stud 113, is tensioned to bias the stud 113 upwardly to draw the plunger 105 upwardly to release the jaws 103 and 104 and permit them to close upon the end of an electrode.

In this form the cooperating socket lugs 118 and 119 each have a semi-circular camming flange 121 extending outwardly therefrom adapted to be engaged by the knob 116, when the head 101 is swung upon its pivot into the position indicated in dotted lines in Figure 9, to press it inwardly and cause the plunger 105 to open the jaws 103 and 104 and eject an electrode from between them. A circular, and arcuate in cross-section, guard plate 122 of insulating material is clamped between the camming flanges 121 and the handle 123 when the parts of the electrode holder are assembled together. In this form the lug, or flattened end, 124 to which the lugs 118 and 119 are bolted by the bolt 125, may also be formed integral with the cable connecting block 126. The handle 123 in this form extends out over the bolted joint between the lugs 124, and 118 and 119, into clamping engagement with the guard plate 122 and, when secured to the connecting block 126 by the screw 127, secures it in place.

From the above it will be noted that all of the forms illustrated provide an improved electrode holder adapted to dispose an electrode in places difficult to reach by the use of present forms of electrode holders. It will be also noted that means is provided, in all of the forms illustrated, to substantially simultaneously open electrode gripping jaws and eject an electrode therefrom. These forms also include means to substantially prevent molten metal spatter, from the welding operation, from striking the jaws to adhere thereto and to shield them from heat radiating from the welding arc.

It will be understood that the novel features and principles of this invention may be embodied in other specific forms without departing from the spirit or essential attributes thereof, and it is therefore desired that the present embodiments be considered in all respects as illustrative and not restrictive, reference being had to the claims rather than to the foregoing description to indicate the scope of the invention.

Having thus fully disclosed the invention, what is claimed as new and for which it is desired to obtain Letters Patent, is:

1. In an electrode holder, opposed jaws biased toward each other to grip an electrode therebetween, and means movable lengthwise of said jaws to spread said jaws apart to release an electrode and to engage an end of the electrode to eject it from between the jaws.

2. In an electrode holder, opposed jaws biased toward each other to grip an electrode therebetween, means to spread said jaws apart to release an electrode and to eject the electrode from between the jaws, releasable means to restrain said jaw spreading means in jaw spreading position, and means to release said restraining means.

3. In an electrode holder, opposed jaws biased toward each other to grip an electrode therebetween, means to spread said jaws apart to release an electrode and to eject the electrode from between the jaws, means to actuate said jaw spreading and ejecting means, releasable means to restrain said jaw spreading means in jaw spreading position, and means to release said restraining means.

4. In an electrode holder, opposed jaws biased toward each other to grip an electrode therebetween, means to spread said jaws apart to release an electrode and to eject the electrode from between the jaws, releasable means to restrain said jaw spreading means in jaw spreading position, and means positioned to be engaged and actuated by an electrode being inserted between said spread apart jaws to release said restraining means.

5. In an electrode holder, a handle, an electrode carrying head pivoted to a first end thereof to said handle to swing in a plane transverse to the axis thereof, opposed jaws carried by said head to receive and grip an electrode in position to extend from a second end of said head, and a member of insulating material, carried by the second end of said head, surrounding said jaws and having an opening through which the electrode extends.

6. In an electrode holder, a handle, an electrode carrying head pivoted to said handle to swing in a plane transverse to the axis thereof, opposed jaws carried by said head and biased toward each other to grip an electrode therebetween, a member of insulating material surrounding said jaws and having an opening through which the electrode extends, and means within said head to spread the jaws apart and to eject the electrode therefrom.

7. In an electrode holder, a handle, an electrode carrying head pivoted to said handle to swing in a plane transverse to the axis thereof, opposed jaws carried by said head and biased toward each other to grip an electrode therebetween in position to extend from one end of the head, means in said head operable to spread said jaws apart and to eject an electrode therefrom, and means to actuate said jaw spreading means and extending from the other end of said head.

8. In an electrode holder, opposed jaws biased toward each other to grip an electrode therebetween, extending axially from the jaws, and means adapted to move lengthwise of the jaws to engage the gripped end of the electrode and eject it from the jaws.

9. In an electrode holder, opposed jaws biased toward each other to grip an electrode therebetween, means adapted to move lengthwise of the jaws to spread them apart and release a gripped electrode, a handle to which said jaws are connected, a guard plate extending transversely in respect to the axis of said handle and disposed between it and said jaws, and cooperating means between said head and said plate to actuate said jaw spreading means.

10. In an electrode holder, a handle, an electrode carrying head pivoted to said handle to swing in a plane transveres to the axis thereof, opposed jaws carried by said head and biased toward each other to grip an electrode therebetween in position to extend from one end of the head, means in said head operable to spread said jaws apart, a guard plate extending transversely in respect to the axis of said handle and disposed between it and said head, a plunger extending from the other end of said head and adapted to slide therein to actuate said jaw spreading means, when said head is swung to cause said plunger to be engaged by said guard and pressed into said head.

11. In an electrode holder, a handle, an electrode carrying head pivoted to said handle to swing in a plane transverse to the axis thereof, opposed jaws carried by said head and biased toward each other to grip an electrode therebetween in position to extend from one end of the head, means in said head operable to spread said jaws apart, and to eject an electrode therefrom, a guard plate extending transversely in respect to the axis of said handle and disposed between it and said head, a plunger extending from the other end of said head and adapted to slide therein to actuate said jaw spreading and electrode ejecting means, said guard being disposed in respect to the outer end of said plunger to be engaged thereby, when swung toward the guard by swinging movement of said head, and be pressed into said head to actuate said jaw spreading and electrode ejecting means.

12. In an electrode holder, a tubular handle, a cable connecting block in said handle, a hinge member on said block and extending from an end of said handle, an electrode carrying head having a hinge member cooperating with the hinge member on said block, opposed electrode gripping jaws carried by said head and extending from one end thereof, said jaws being biased toward each other to firmly grip an electrode disposed therebetween, means in said head, extending lengthwise in-between said jaws, and adapted when moved lengthwise to spread said jaws apart to release an electrode gripped thereby, and means to actuate said jaw spreading means.

13. In an electrode holder, a tubular handle, a cable connecting block in said handle, a hinge member on said block and extending from an end of said handle, an electrode carrying head having a hinge member cooperating with the hinge member on said block, opposed electrode gripping jaws carried by said head and extending from one end thereof, said jaws being biased toward each other to firmly grip an electrode disposed therebetween, means in said head, extending lengthwise in-between said jaws and having a part to engage the inner end of an electrode gripped by said jaws, and adapted when moved lengthwise to spread said jaws to release an electrode held therebetween and eject it therefrom, and means to actuate said jaw spreading and electrode ejecting means.

14. In an electrode holder, a tubular handle, a cable connecting block in said handle, a hinge member on said block and extending from an end of said handle, an electrode carrying head having a hinge member cooperating with the hinge member on said block, opposed electrode gripping jaws carried by said head and extending from one end thereof, said jaws being biased toward each other to firmly grip an electrode disposed therebetween, means in said head, extending lengthwise in-between said jaws and having a part to engage the inner end of an electrode gripped by said jaws, and adapted when moved lengthwise to spread said jaws to release an electrode held therebetween and eject it therefrom, and means extending from the other end of said head and slidable therein to actuate said jaw spreading and electrode ejecting means.

15. In an electrode holder, a handle, an electrode carrying head pivoted at a first end thereof to said handle, opposed jaws carried by said head and adapted to receive an electrode therebetween to extend lengthwise from a second end of said head, and a closed end cup-shaped member of insulating material secured to and extending from the second end of said head with its closed end covering the outer ends of said jaws and having a hole in its closed end through which an electrode extends, when held by said jaws.

JACK CHURCHWARD.